Patented July 12, 1932

1,866,686

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE ESTERIFICATION OF CELLULOSE

No Drawing. Application filed September 26, 1929. Serial No. 395,454.

This invention relates to a process for esterifying cellulose and particularly to a new type of catalyst which is used for the esterification.

The esterfication of cellulose by an organic acid anhydride in a suitable solvent solution is facilitated by the use of a catalyst. The catalysts which have heretofore been employed are legion including among their number mineral acids, organic acids and salts of both inorganic and organic acids which ionize to give a sufficient degree of acidity. From a commercial standpoint, however, the catalyst which is most useful is sulfuric acid, due to its availability and to the facility with which it may be used. The use of this catalyst does not require, nevertheless, critical temperature control and, because of its energetic catalytic action which may result in serious degradation of the cellulose product, necessitates the use of expensive refrigerating equipment to control the action within proper limits. It is due to these facts that the investigators in this field have endeavored to replace the sulfuric acid but, up to the present time, mostly with little success.

An object of the present invention is to provide a process for the acetylation of cellulose in which a new type of catalyst is employed. Another object of the invention is to provide a process which is safe, rapid, and easily controlled and which will yield cellulose acetate free from serious degradation. Other objects will hereinafter appear.

We have found that cellulosic materials, such, for example, as cotton linters or other similar cellulosic materials may be readily and easily acetylated if these materials be esterified in a bath containing sulfur dioxide and an oxide of nitrogen. The oxides of nitrogen which may be used for this purpose include nitrogen peroxide or dioxide, nitrogen tetroxide, or, for that matter, any of the higher oxides of nitrogen or nitric oxide in the presence of air. The use of our new catalyst results in smooth and uniform acetylation of the cellulose with little or no degradation and a product of exceptional purity.

It is known that the presence of water with sulfur dioxide and nitrogen dioxide produces nitrosyl sulfuric acid, which, in turn, decomposes to form sulfuric acid and the oxides of nitrogen when both water and oxygen are present. In the acetylation of cellulose, however, by the usual methods, water can not exist, for as soon as any is formed in the solution it reacts instantly with the acetic anhydride to form acetic acid. It is, therefore, evident that this compound nitrosyl sulfuric acid is not existent in the acetylating mixture when these two gases have been added thereto and their formation does not explain the ability of these gases to catalyze the reaction.

In order to verify this fact, we attempted to acetylate a cellulosic material with both nitric acid and sulfur dioxide in the presence of the usual acetic anhydride and acetic acid, it being a well known fact that sulfur dioxide and nitric acid combine to form nitrosyl sulfuric acid, but we found that no appreciable acetylation took place even after a period of five hours at an optimum temperature. At the end of this unsuccessful acetylation period, gaseous oxides of nitrogen were introduced into the acetylation mixture with the result that almost immediately the reaction commenced and within one hour indicated nearly complete esterfication of the cellulose. The formation, therefore, of nitrosyl sulfuric acid does not explain the catalytic action of our gaseous catalyst, sulfur dioxide-nitrogen dioxide. While our attempts to explain the catalytic action between these two gases have not been successful, their use, nevertheless, results, by the process that will hereinafter be explained, in a cellulose acetate which may be acetylated to the desired extent.

It will be evident to those skilled in this art that these gases may be added during the acetylating process either in the pretreatment stage, that is, in the preparation of the cellulosic material prior to the addition thereto of the acetic anhydride, or during the acetylation step, that is when the anhydride and the catalyst are added to the pretreated cellulosic material. The gaseous catalyst may be added to either of these steps of the acetylation process, or to the acetylation bath itself if no pretreatment is employed, either by bubbling the gas into the solution or by first absorbing the gas in a suitable solvent, for example, acetic acid and then adding the solvent thus charged with gas to the esterifying bath. The nitrogen dioxide or any of the equivalent oxides of nitrogen may, if desired, be dissolved in the acetic anhydride prior to its addition to the second stage of the acetylation process.

While we generally prefer to prepare the cellulose acetate in the so-called "dope" form, that is, dissolved in the acetylating solution, it may be prepared in the so-called "fibrous form" by addition thereto during the pretreatment of the cellulosic material or at the start of the acetylation, of a sufficient quantity of a non-solvent of the cellulose acetate produced, such, for instance, as carbon tetrachloride and benzene, etc. The preparation of the ester in the "fibrous form" has some advantages as it renders the ester more easily washed and dried and facilitates later solution.

If the oxides of nitrogen are present in the acetylation solution in excess of the quantity of sulfur dioxide, the cellulose acetate produced will be soluble in acetone. This result is very unexpected because it is usually necessary to acetylate cellulose to the fully acetylated form (the triacetate which is generally soluble in chloroform) and later to subject it to a hydrolyzing bath whereby its solubility is changed from chloroform to acetone solubility. The direct acetylation to acetone solubility by the use of the oxides of nitrogen alone as a catalyst is thoroughly described in copending application Serial No. 378,557, in which we are joint inventors with Russell H. Van Dyke. By utilizing our process, this hydrolysis step may, if desired, be eliminated. If it be desired to produce a cellulose acetate which is chloroform-soluble, it is merely necessary to maintain in the acetylating bath approximately equal molecular proportions of the two gases.

The concentration of the gases may vary considerably according to the type of product it is desired to obtain. We have found that a concentration of approximately 5% to 25% of sulfur dioxide and an equivalent amount of the oxide of nitrogen based, upon the weight of the cellulose originally used, will prove generally most suitable. If the cellulose acetate is to be obtained directly in the form of the acetone-soluble product, a higher percentage of the oxide of nitrogen should be used for instance, approximately 2 times the amount of sulfur dioxide. These concentrations are used when the temperature of the reacting mixture is kept below 40 to 50° C. and atmospheric pressure is employed. If a higher temperature and pressure be used, the velocity of the reaction will be necessarily increased and it will likewise be possible to use a lesser proportion of the catalyst than above stated.

We shall now give several methods of carrying out our process, but it shall be distinctly understood that we are not to be limited by the details therein given, except as indicated in the appended claims.

*Example 1.*—50 parts of cotton linters may be placed in 350 parts of glacial acetic acid in which from 6 to 10 parts of sulfur dioxide have been dissolved. This mixture is allowed to stand at room temperature for 16 to 18 hours. 150 parts of 85% acetic anhydride, into which 7½ parts of nitrogen dioxide has been dissolved, may be then added. The container is cooled by a water bath to a temperature approximately 23° C. and the reacting mass thoroughly agitated. The temperature of the water bath is gradually increased to about 40 to 50° C. to obtain the desired rate of reaction. After 8 hours a product is formed which is soluble in chloroform and ethylene chloride. This ester may be hydrolyzed by any of the approved methods.

*Example 2.*—50 parts of cotton linters may be placed in a mixture of 100 parts of glacial acetic acid, 10 parts of sulfur dioxide and 250 parts of carbon tetrachloride. After thorough mixing the mass is allowed to stand at room temperature for one hour when a mixture of 190 parts of carbon tetrachloride and 170 parts of 85% acetic anhydride containing 6.8% of nitrogen dioxide by weight are added with vigorous stirring. The considerable heat which is developed is controlled by a water jacket and by stirring. The product which is of a fibrous nature, after thorough washing and drying, is found to be soluble in chloroform and ethylene chloride. This product may likewise be changed to the acetone-soluble cellulose acetate by any of the approved hydrolyzing procedures.

The order of introducing the gases may be altered in any manner as to time or succession. The acetylation will in no case, however, proceed until both gases are present. The quantities of the gases can be varied considerably, the gas in the smaller molecular ratio controlling the reaction rate. By having one gas slightly in excess, the particular characteristics imparted to the resulting products by that gas will be evident. For example, if sulfur dioxide is in molecular excess, a decrease in the viscosity of the resulting product is obtained with a substantial bleaching of the cellulose acetate, while if nitrogen dioxide be in excess, an increased viscosity results with a direct production of acetone soluble cellulose ester if sufficient excess be added.

It is evident from a study of the above described process that the proportions of these gases may be varied through wide limits and various oxides of nitrogen may be employed with the production of a cellulose acetate either in solution or in the fibrous form of the chloroform or acetone soluble variety without in any way departing from this invention or sacrificing any of the advantages derived therefrom.

Having thus described our invention, what we claim as new and desire to secure by Letters Patent is:

1. The process of making cellulose acetate which comprises treating cellulose with an acetylating bath and catalyzing the reaction with sulfur dioxide and an oxide of nitrogen.

2. The process of making cellulose acetate which comprises treating cellulose with a non-solvent acetylating bath and catalyzing the reaction with sulfur dioxide and an oxide of nitrogen.

3. The process of making cellulose acetate which comprises treating cellulose with an acetylating bath and catalyzing the reaction with sulfur dioxide and nitrogen dioxide.

4. The process of making cellulose acetate which comprises treating cellulose with an acetylating bath containing carbon tetrachloride and a catalyst consisting of sulfur dioxide and nitrogen dioxide.

5. The process of making cellulose acetate which comprises treating cellulose with an acetylating bath containing sulfur dioxide and an amount of nitrogen dioxide in excess of that of the sulfur dioxide.

6. The process of making cellulose acetate which comprises treating cellulose with a non-solvent acetylating bath containing sulfur dioxide and an amount of oxide of nitrogen in excess of that of the sulfur dioxide.

7. The process of making cellulose acetate which comprises treating cellulose with a solution of acetic acid containing dissolved sulfur dioxide, subsequently adding thereto an acetic anhydride solution containing nitrogen dioxide and continuing the reaction until the desired cellulose acetate is obtained.

8. The process of making cellulose acetate which comprises treating cellulose with an acetic acid solution containing carbon tetrachloride and dissolved sulfur dioxide, subsequently adding acetic anhydride in which there has been dissolved nitrogen dioxide in an amount greater than the sulfur dioxide which was added to the bath with the acetic acid, and continuing the reaction until an acetone-soluble cellulose acetate is obtained.

Signed at Rochester, New York, this 21st day of September, 1929.

CHARLES S. WEBBER.
CYRIL J. STAUD.

CERTIFICATE OF CORRECTION.

Patent No. 1,866,686. July 12, 1932.

CHARLES S. WEBBER ET AL.

It is hereby certified that error appears in the printed specification of the above numbered patent requiring correction as follows: Page 1, line 17, strike out the word "not"; and that the said Letters Patent should be read with this correction therein that the same may conform to the record of the case in the Patent Office.

Signed and sealed this 1st day of November, A. D. 1932.

(Seal)

M. J. Moore,
Acting Commissioner of Patents.